April 22, 1930. E. W. GOESER 1,755,252
UPSET LOCK PIN FOR CHAIN BELTS
Filed May 24, 1926
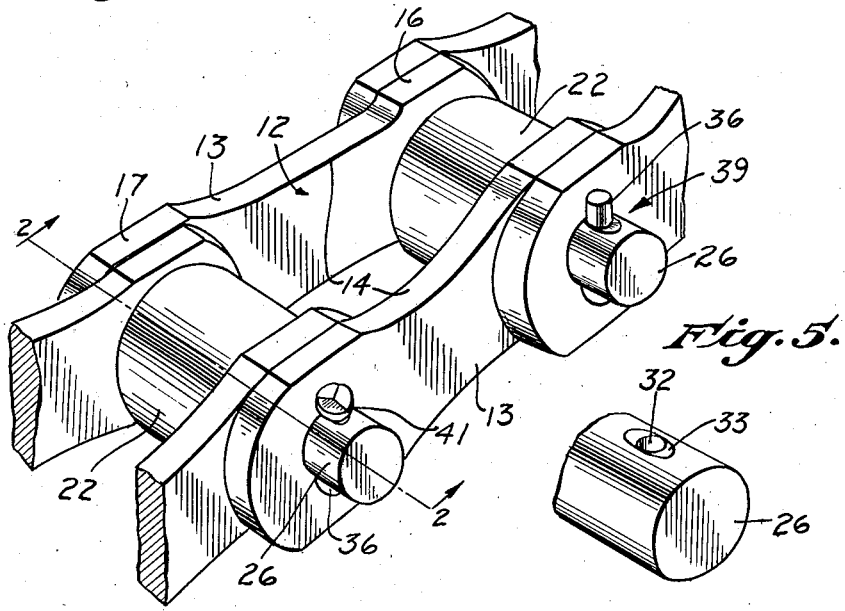
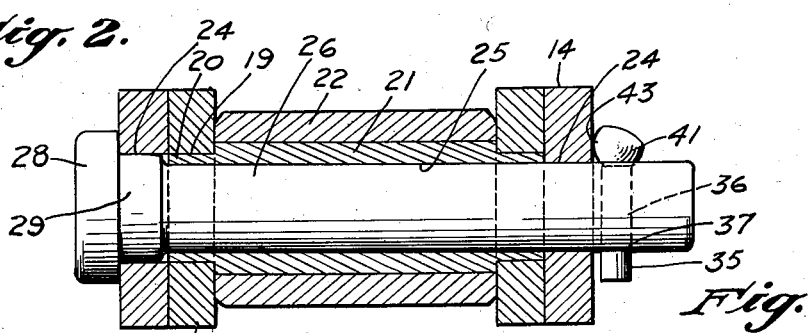
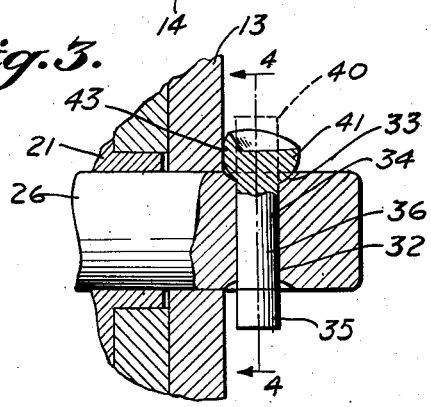
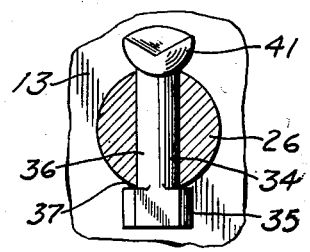
INVENTOR:
EDWIN W. GOESER,
BY Fad Alamit
ATTORNEY.

Patented Apr. 22, 1930

1,755,252

UNITED STATES PATENT OFFICE

EDWIN W. GOESER, OF LOS ANGELES, CALIFORNIA, ASSIGNOR TO EMSCO DERRICK & EQUIPMENT COMPANY, OF LOS ANGELES, CALIFORNIA, A CORPORATION OF CALIFORNIA

UPSET LOCK PIN FOR CHAIN BELTS

Application filed May 24, 1926. Serial No. 111,245.

This invention relates to heavy duty sprocket chains, and particularly to chains such as are used in the oil producing industry to drive the rotary table, draw-works and other derrick machinery. These chains are called upon to transmit enormous power, and they must be very strong. The common sprocket chain in use in the oil fields consists of links made up of a pair of bars, and pins for pivotally securing the links together. The pins are held in place by means of cotter keys.

I have found that a sprocket chain is much more capable of standing up under the heavy loads to which they are exposed if the different parts are held positively and firmly in proper relative positions. In my invention, in place of using the ordinary cotter pin for holding the pivot pin in place I use a rivet which is secured in place so that the upset end is caused to engage the adjacent part of a link bar and to firmly hold the parts thereof in place between the head of the pivot pin and the rivet.

It is one of the objects of this invention to provide a sprocket chain in which the pivot pins are riveted in place in such a manner that the parts of the sprocket chain are firmly held in proper positions.

Other objects and advantages of the invention will be made evident hereinafter.

Referring to the drawing in which I illustrate a preferred form of this invention, Fig. 1 is a perspective view of a sprocket chain incorporating the features of this invention.

Fig. 2 is a section taken on the line 2—2 of Fig. 1.

Fig. 3 is an enlarged fragmentary section showing clearly the manner in which the rivet is placed.

Fig. 4 is a section taken on the line 4—4 of Fig. 3.

Fig. 5 is a perspective view of an end of a pivot pin before the rivet has been placed therethrough.

The form of my invention shown in the drawing is embodied in a chain which consists of a multiplicity of links indicated at 12 which are pivotally secured together. Each link 12 has link bars 13 which are offset as indicated at 14 so as to provide inside ends 16 and outside ends 17. The inside ends 16 of the link bars 13 are provided with openings 19 into which ends 20 of a bushing 21 extend. Surrounding the bushing 21 between the inside ends 16 is a roller 22. The outside ends 17 of the link bars 13 are provided with openings 24 which align with an opening 25 through the bushing 21. Extended through the openings 24 and 25 is a pivot pin 26. One end of the pivot pin 26 is provided with a head 28 which engages the outer face of the outside end of one of the link bars 13. A formation 29 is formed adjacent to the head 28 which rests in one of the openings 24 and is provided for the purpose of preventing the pivot pin 26 from rotating relatively to the link 12 having the outside ends through which this pivot pin extends. The opposite end of the pivot pin 26 is provided with a cylindrical diametrically extending opening 32. At the ends of the openings 32 there are formed countersinks 33 which are formed on the opposite sides of the mouths of the openings 32 in alignment with the axis of the pivot pin 26. These countersinks 33 have curved faces which slant inwardly towards the center of the pin as the opening 32 is approached. This is clearly shown in Figs. 3 and 5.

Extending through the opening 32 is a rivet 34. The rivet 34 is provided with a head 35 which is the same width as the diameter of a body 36 of the rivet but is longer, as illustrated in Fig. 4, so as to provide shoulders 37 which engage the pin 26 at opposite sides of the opening 32. The rivet 34 is first extended into place through the opening 32, as illustrated at 39 in Fig. 1, the rivet being hot at this time. Referring to Fig. 3, the extending end of the rivet 34 is then peened or upset from the shape indicated at 40 into the shape of a peened head 41. The peening of the head 41 is accomplished by means of a special tool which forms the subject matter of an application of Jesse Osmond and Carl H. Lindblom, entitled Tool for upsetting rivet pins, Serial No. 96,490, filed March 22, 1926. The peened head 41 is formed in such a manner that an inner portion 43 thereof is forced sidewardly against the outer face of the outside end of the adjacent link bar 13. The ends of the link bars 13 and the bushing 21 are therefore clamped firmly between the rivet 34 and the head 28 of the pivot pin 26.

The countersinks 33, at the end of the opening 32 where the peened head 41 is formed, tend to cause the peened head 41 to elongate so that the portion 43 will be sure to move into contact with the adjacent link bar 13. As illustrated in Fig. 3, a lower part of the peened head 41 is forced into the adjacent countersinks 33 and for this reason the rivet 34 will be prevented from rotating. The head 35 is made narrow so that the rivet 34 may be readily extended through the opening 32 without any engagement with the adjacent link bar 13.

In the sprocket chain incorporating the features of this invention the parts thereof are held firmly in their proper positions, and there will be less strains on any of the parts while the chain is in use. This is especially true with respect to the pivot pins 26. In the ordinary sprocket chain where the parts are not clamped together as in my invention, the parts being loose may twist or be moved out of their proper positions and undue strains will be imposed upon the pivot pins. The pivot pins of a sprocket chain are usually considered to be the weakest parts and they are most liable to break. In my invention much strain is removed from the pivot pins by preventing any twisting of the parts and therefore there will be less liability of the pins breaking.

The important part of this invention resides in a sprocket chain having a pivot pin which is riveted in place so as to hold the parts thereof in proper position, and the construction which tends to cause the peened head of the rivets 34 to move into desired engagement with an adjacent part of one of the link bars 13.

I claim as my invention:

1. In a sprocket chain, the combination of: a pin having a head at one end, there being a hole bored through the opposite end of said pin; link parts having apertures so that when assembled said pin may be inserted through said parts; and a rivet having a head at one end and insertable in said hole, the other end of said rivet then being swedged to bear against one of said link parts to cooperate with said pin-head in unyieldingly clamping said link parts in fixed assembled relation upon said pin.

2. In a sprocket chain, the combination of: a pin having a head at one end, there being a hole bored through the opposite end of said pin; link parts having apertures so that when assembled said pin may be inserted through said parts; and a rivet having a head at one end and insertable in said hole, the other end of said rivet then being swedged to bear against one of said link parts to cooperate with said pin-head in holding said link parts in fixed assembled relation upon said pin, there being a recess formed in said pin about a mouth of said hole, the swedged end of said rivet entering said recess to prevent rotation of said rivet after said swedging.

3. In a sprocket chain, the combination of: a pin having a head at one end, there being a hole bored through the opposite end of said pin; link parts having apertures so that when assembled, said pin may be inserted through said parts; and a rivet having a head at one end and insertable in said hole, the other end of said rivet then being swedged to bear against one of said link parts to cooperate with said pin-head in holding said link parts in fixed assembled relation upon said pin, there being a recess formed in said pin at one end of said hole on the side adjacent to said parts for guiding the swedged end of said rivet into pressural contact with said parts so that said parts are firmly clamped together and cannot twist or move outwardly when said chain is in use.

4. In a sprocket chain, the combination of: a pin having a head at one end, there being a hole bored through the opposite end of said pin; link parts having apertures so that when assembled said pin may be inserted through said parts; and a solid rigid rivet having a head at one end and insertable in said hole to fill the same, the other end of said rivet then being swedged to radially thicken the same and to provide an enlargement cooperating with the head of the rivet to thereby prevent spreading of the link parts.

5. In a sprocket chain, the combination of: a sleeve; a roller rotatable on said sleeve; a primary pair of links mounted on the ends of said sleeve; a pair of secondary links one being located outside each of the said primary links; a pin adapted to extend through said sleeve and said secondary links, said pin having a body and a head at one end thereof, said body being insertable through said sleeve and said secondary links after they have been placed in aligned position, said head having a shoulder for engaging an adjacent secondary link, there being an opening formed through said body at the end opposite said head; and a heavy rivet extended through said opening, said rivet having a head on one end thereof and being swedged on the other end thereof, thus rigidly binding said rivet to said body and providing a rivet with enlargements on both ends thereof engageable by the adjacent secondary link.

6. In a sprocket chain, the combination of: a sleeve; a roller rotatable on said sleeve; a primary pair of links mounted on the ends of said sleeve; a pair of secondary links one being located outside each of the said primary links; a pin adapted to extend through said sleeve and said secondary links, said pin having a body and a head at one end thereof, said body being insertable through said sleeve and said secondary links after they have been placed in aligned position, said head having a shoulder for engaging an adjacent secondary link, there being an opening formed through said body at the end opposite said head; and a heavy rivet extending through said opening, said rivet having enlargements on the ends thereof, said rivet rigidly engaging said pin so as to be rigidly secured thereto and at least one of said enlargements being engageable by the adjacent secondary link.

7. In a sprocket chain, the combination of: a pin having a head at one end, there being a hole extending through the opposite end of said pin; link parts having apertures so that when assembled said pin may be inserted through said parts; and a heavy solid rigid rivet inserted in the hole to fill the same, one end of the rivet being provided with a head and the other end of said rivet being swedged to radially thicken the same and to provide an enlargement cooperating with the head of the rivet to limit the spreading of said link parts, said head and enlargement provided by the rivet engaging the pin to prevent longitudinal movement of the rivet.

8. In a sprocket chain, the combination of: a pin having a head at one end, there being a hole extending through the opposite end of said pin, link parts having apertures so that when assembled said pin may be inserted through said parts and a heavy solid rigid rivet having a flat head at one end and inserted in said hole to fill the same, and the other end of said rivet being swedged to radially thicken the same and provide an enlargement cooperating with the said flat head of the rivet to thereby limit the spreading movement of the link parts, said flat head serving to prevent rotation of the rivet by engagement wtih the adjacent link part.

In testimony whereof, I have hereunto set my hand at Los Angeles, California, this 15th day of May, 1926.

EDWIN W. GOESER.